Dec. 2, 1930.    B. G. FORBSTEIN    1,783,562
METER FOR SEWING MACHINES
Filed June 25, 1929
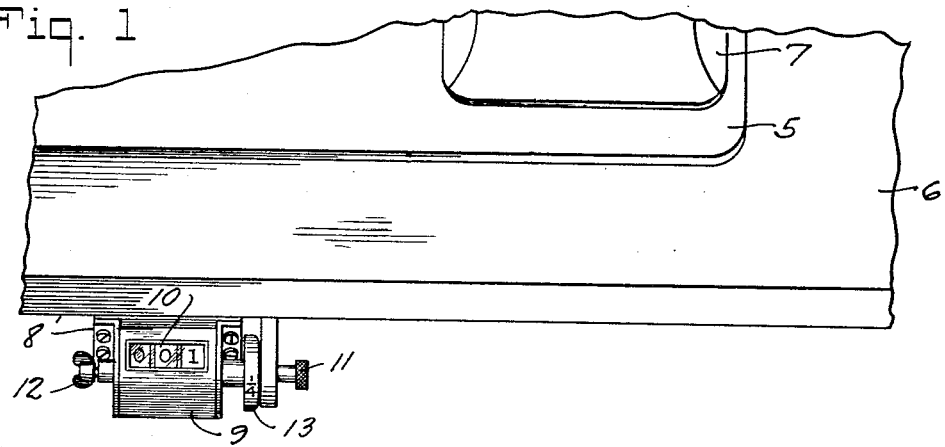
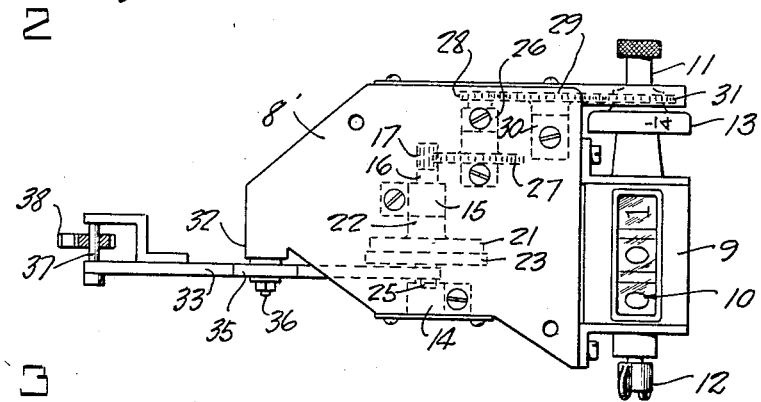
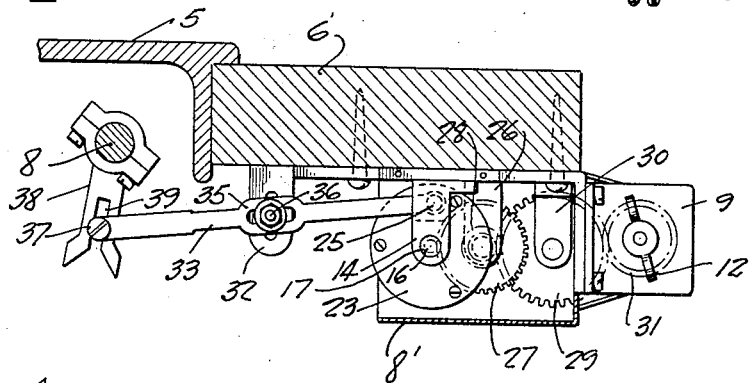
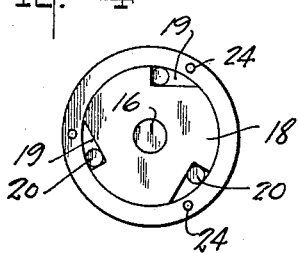
INVENTOR
Bessie Gallas Forbstein
BY Westall and Wallace
ATTORNEYS Patented Dec. 2, 1930

1,783,562

UNITED STATES PATENT OFFICE

BESSIE GALLAS FORBSTEIN, OF LOS ANGELES, CALIFORNIA

METER FOR SEWING MACHINES

Application filed June 25, 1929. Serial No. 373,553.

This invention relates to a metering mechanism adapted for measuring the lineal extent of stitching performed on sewing machines. It is the current practice to base the charge for hem stitching upon the lineal feet, yard or fraction thereof of stitching. It is the common practice to measure the stitching after the work is done and in the case of irregular lines of stitching, the work of measuring is laborious, requires a great amount of time and results in inaccuracy. The present invention pertains to an attachment which will automatically measure the stitching as it is done upon the sewing machine.

The objects of this invention are to provide a measuring attachment of the above described character which has any or all of the following features: a meter for registering the lineal distance stitched; means gearing the operating parts of the machine to the meter so that the meter registers with accuracy the lineal feed of the goods worked upon with respect to the stitching lines and which automatically accommodates itself to variations in the amount of feed; a metering device which does not require any alteration or adaption of the sewing machine parts to its installation; and a measuring device having a progressive one-way engagement clutch and an operating arm whose stroke is proportional to the stroke of the feed bar.

These objects together with other objects and corresponding accomplishments are obtained by means of the embodiment of my invention illustrated in the accompanying drawings, in which:—

Fig. 1 is a plan view of a fragment of a sewing machine with my attachment secured thereto; Fig. 2 is a plan view of the measuring mechanism with the rocker or oscillative arm in section; Fig. 3 is an elevation partly in section through the front of the bed of the sewing machine and the meter mechanism; and Fig. 4 is a detail view in elevation of the clutch.

Referring more particularly to the drawings, 5 marks the bed of a sewing machine mounted in a table frame 6, a fragment of the head being marked 7. An oscillating shaft 8 transmits motion to the feed bar, not shown. The parts of the sewing machine just described are those of a well known type of hem stitching machine and form no part of the present invention.

Mounted upon the under side of the table portion 6 is a casing 8' housing gears for transmitting motion to a meter 9. This meter may be of any well known type which is arranged to accumulate and record in numerals. In the particular construction shown, cylinders carrying numerals register the number of yards, these cylinders being indicated generally by 10. A rotatable shaft 11 is provided for turning the register cylinders and 12 indicates a resetting key. A fractional yard disk 13 is mounted upon shaft 11. Any other type of register may be used provided it has a rotary shaft, the details thereof not being pertinent to the present invention.

Bearing pillars 14 and 15 are mounted in the casing and journalled therein is a shaft 16 having a pinion 17 overhanging pillar 15. Secured to the shaft 16 is a clutch member 18 having pockets 19 in which are mounted rollers 20. A clutch drum 21 encompasses the disk 18 and has a hub 22 journalled upon shaft 16. A cover 23 closes the drum and has a hub journalled on shaft 16. The cover may be secured to the drum by means of screws, the screw holes in the drum being indicated by 24. The disk, drum and cover provide a one-way progressive clutch. Extending from the cover is a crank pin 25 providing a wrist for connection thereto of a connecting rod. Mounted in a bearing bracket 26 is a shaft having a gear 27 meshing with pinion 17 and an overhanging gear 28. Gear 28 meshes with an idler gear 29 journalled in a bracket 30 and the idler gear meshes with a gear 31 mounted upon the register shaft. Oscillation of the clutch driving member will cause corresponding intermittent movement in one direction of the driven clutch member and this motion is transmitted to the register shaft. Depending from the upper wall of the casing is a bracket 32 having an elongated bolt hole. A connecting rod 33 is secured to the pin 25 and has a yoke 35, in the slot of which is a guide pin 36. Guide pin 36 is adjustably mounted in position in the bolt opening of bracket 32. At the end of the connecting rod is a pin 37 which is disposed in a slot of an oscillatable arm 38. Arm 38 has a divided clamp at the end so that it may be secured to the oscillating shaft 8. At the other end it is provided with a slot 39 which receives pin 37.

The device is adapted to be mounted upon the underside of the table frame by securing the casing thereto. The oscillative arm is placed in position on the shaft 8 and the position of pin 36 is adjusted to provide the proper stroke to obtain accurate reading of the register. The stroke of the connecting rod is proportional to the angle of oscillation of shaft 8, and the latter moves in accordance with the stroke of the feed bar. After initial adjustment of the pin 36, the stroke of the connecting rod will always be proportional to the length of the stitches and the feed of the clutch regardless of any adjustment of the stitches and speed. Due to the character of the clutch, there will be no lost motion or inaccuracy and any variation in the feed bar stroke is automatically compensated for by the oscillative arm and connecting rod.

What I claim is:—

1. For a sewing machine having a frame, an oscillating shaft for operating a feed bar; a device adapted to measure stitching comprising an oscillative arm having a slot, a connecting rod having a pin slidably and adjustably mounted in said slot, said connecting rod having a guide slot, a pin mounted in normally stationary relation to said frame and slidably cooperating with said guide slot, a progressive engagement one-way clutch having a drive member and a driven member, a crank pin on said drive member secured to said connecting rod, and a register positively connected to said driven member.

2. For a sewing machine having a frame and an oscillating shaft for operating a feed bar; a device adapted to measure stitching comprising an oscillative arm having a slot, a connecting rod having a pin slidably mounted in said slot, a bracket on said frame, a guide pin adjustably positioned on said bracket in lateral relation to said connecting rod, said connecting rod having a guide slot, said guide pin slidably cooperating with said guide slot, a progressive engagement one-way clutch having a drive member and a driven member, a crank pin on said drive member secured to said connecting rod, and a register positively connected to said driven member.

3. For a sewing machine having a frame and an oscillating shaft for operating a feed bar; a device adapted to measure stitching comprising an oscillative arm having a slot, a connecting rod having a pin slidably mounted in said slot, said connecting rod having a guide slot, a bracket stationary with respect to said frame having an adjustment slot disposed in approximately perpendicular relation to said connecting rod, a guide pin mounted in said adjustment slot and adjustably secured lengthwise thereof, said guide pin slidably cooperating with said guide slot, a progressive engagement one-way clutch having a drive member and a driven member, a crank pin on said drive member secured to said connecting rod, and a register positively connected to said driven member.

4. A device for registering lineal travel of an element of a mechanical motion mechanism having an oscillating shaft comprising an oscillative arm secured to said shaft and having a slot, a connecting rod having a slide member mounted in said slot, said connecting rod having a guide slot, a pin mounted in normally stationary position and adjustable in transverse position with respect to said rod, a progressive engagement one-way clutch having a drive member and a driven member, a wrist pin on said drive member secured to said rod, a register having a rotative operating shaft, and gearing positively connecting said driven member and said shaft.

In witness that I claim the foregoing I have hereunto subscribed my name this 18th day of June, 1929.

BESSIE GALLAS FORBSTEIN.